June 23, 1931.   J. R. HARRISON   1,811,128
BALANCED MAGNETOSTRICTIVE OSCILLATOR
Filed Dec. 11, 1928    2 Sheets-Sheet 1
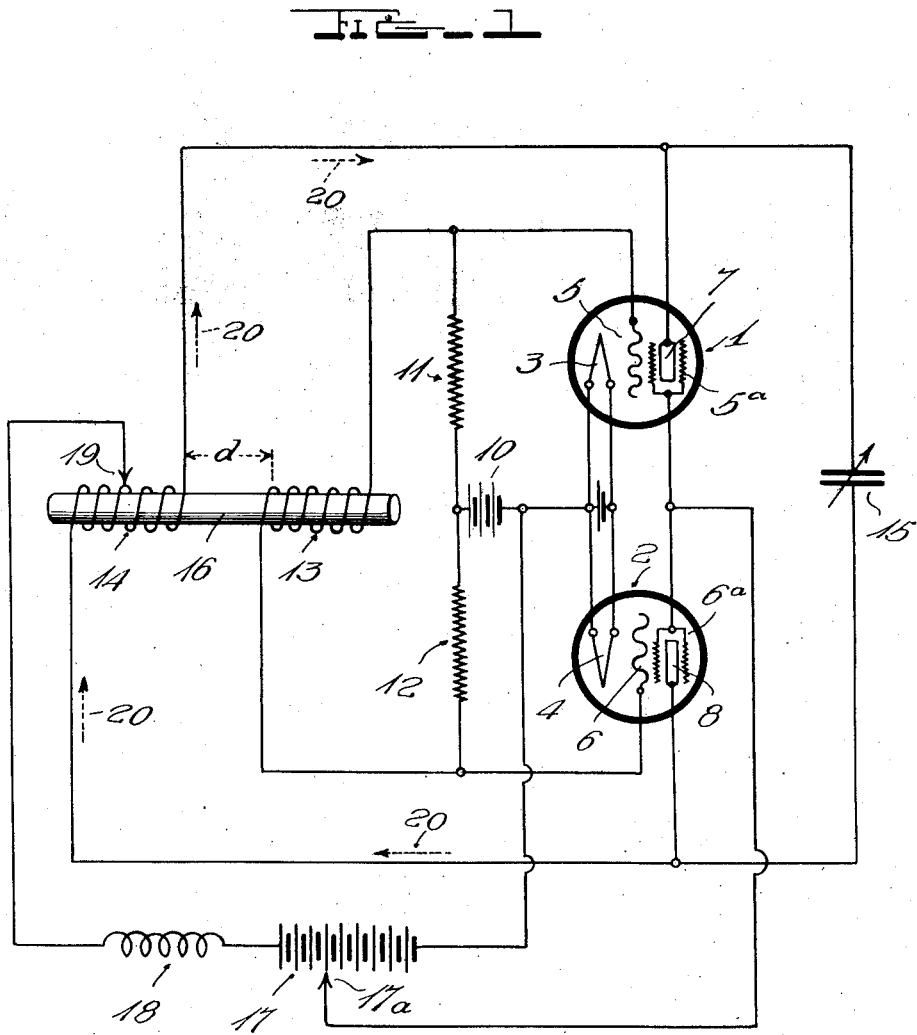
INVENTOR.
Jamison R. Harrison,
BY
ATTORNEY.

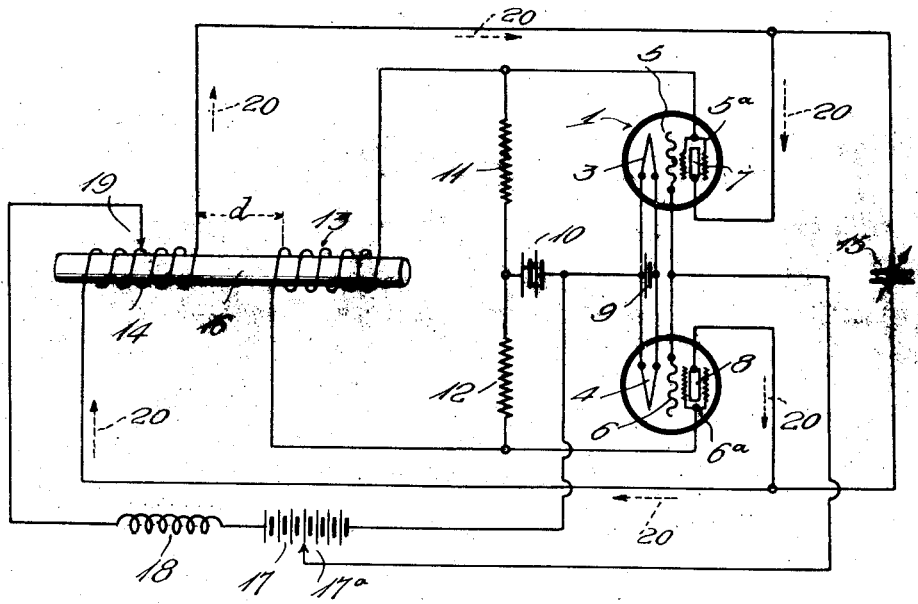
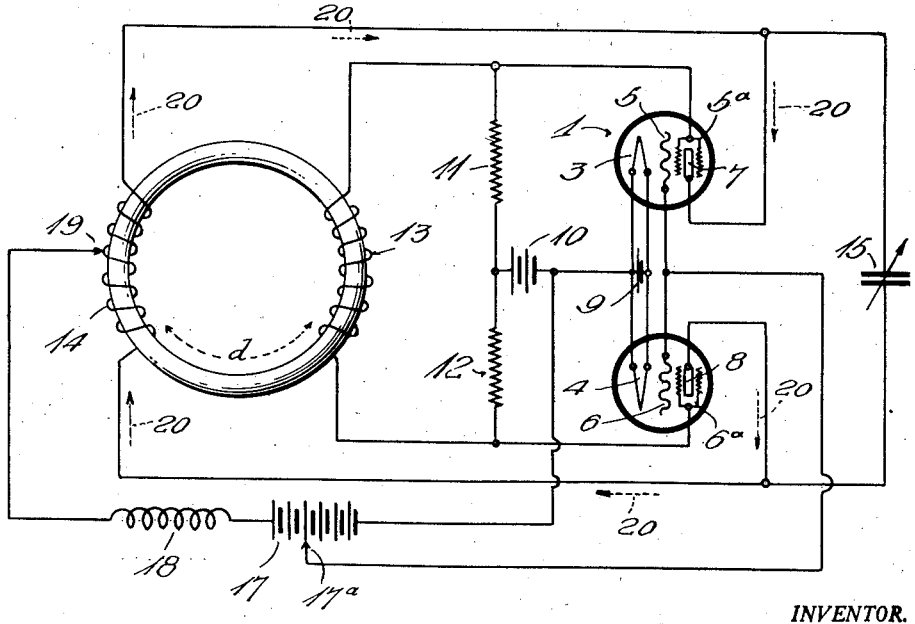

Patented June 23, 1931

1,811,128

UNITED STATES PATENT OFFICE

JAMISON R. HARRISON, OF MIDDLETOWN, CONNECTICUT, ASSIGNOR TO WIRED RADIO, INC., OF NEW YORK, N. Y., A CORPORATION OF DELAWARE

BALANCED MAGNETOSTRICTIVE OSCILLATOR

Application filed December 11, 1928. Serial No. 325,369.

My invention relates to circuit arrangements in general and more specifically to circuit arrangements for producing high frequency electrical energy.

An object of my invention is to provide a high frequency circuit arrangement wherein the generated energy has a constant and steady frequency.

Another object of my invention is to provide a circuit arrangement employing electrically balanced thermionic tubes and wherein the frequency of the generated energy is substantially uniform.

Still another object of my invention is to provide a circuit arrangement wherein a magnetostrictive member is employed in combination with a balanced arrangement of thermionic tubes.

A better understanding of the circuit arrangement of my invention can be had by referring to the specification following and to the accompanying drawings wherein: Figures 1, 2 and 3 are schematic circuit diagrams illustrating the circuit arrangement of my invention.

In the circuit arrangement shown in Fig. 1 of the accompanying drawings, a metallic rod 16 possessing magnetostrictive properties is coupled to the input and output of an electrically balanced amplifier circuit by means of inductance coils 13 and 14 respectively. Because of the magnetostrictive properties of metallic rod 16, energy is transferred from the output coil 14 to the input coil 13 through the mechanically vibrating rod 16 whereby oscillations of electrical energy are sustained in the circuits.

The constants of coils 13 and 14, namely the size and shape, depend upon the size and shape of metallic rod 16 and are most easily determined empirically. The output coil 14 is shunted by the condenser 15 forming a tuned output circuit which is tuned approximately to the resonance frequency of metallic rod 16. Coils 13 and 14 are so arranged that the distance "d" between them may be varied thus allowing proper adjustment of the phase relationship between input and output circuits for maximum power output. This is possible since the energy is transferred from the ouput to the input circuit by means of the mechanically vibrating metallic rod 16 in the form of a wave motion.

The circuit is ordinarily nonoscillatory when the magnetostrictive rod 16 is removed from coils 13 and 14, since the windings of these coils are in the same direction. The circuit may be made self oscillatory without the presence of metallic rod 16 by reversing the direction of the winding of either coil. With this latter arrangement, with the windings in opposite directions, the introduction of rod 16 will stabilize the circuit and maintain the frequency of the generated energy substantially uniform though the circuit constants may be varied over a considerable range. The source of anode supply energy 17 is connected to the anodes 7 and 8 of thermionic tubes 1 and 3 respectively through a center tap 19 on output coil 14. A source of energy for shielding anode electrodes 5a and 6a is obtained by means of tap 17a on source 17. The choke coil 18 is an inductive reactance at the oscillation frequency of the circuit thus acting as a choke to exclude the oscillation currents from source of potential 17.

The currents in the output coil 14 are in such a direction at any given interval of time as to produce an additive effect. The direction of these currents for a given time are indicated by arrows 20. This may be best understood from the following consideration. Consider a wave motion traveling down the magnetorestrictive rod 16. This causes a change in the length of metallic rod 16 and because of its magnetostrictive properties a magnetic field is set up in coil 13. This magnetic field induces a current in the coil. Let us assume that the current is in such a direction that a positive charge is impressed on control electrode 5 whereby the current at the anode 7 is increasing as shown by the arrows 20. At the same time a negative charge is impressed on control electrode 6 of thermionic tube 2 causing the current at anode 8 to diminish. As these currents flow into the output coil 14, they are in the same direction and produce an additive effect. A source of control electrode biasing potential 10 is connected to control electrodes 5 and 6 of thermionic tubes 1 and 2, respectively, through the resistors 11 and 12. Resistors 11 and 12 may be replaced by choke coils. Cathodes 3 and 4 of thermionic tubes 1 and 2 are energized from source 9. The temperature coefficient of the oscillation frequency of the circuit depends upon the nature of the magnetostrictive rod 16. The frequency can be made practically independent of temperature however by enclosing metallic rod 16 in a thermostatically controlled compartment. Higher frequencies can be obtained from this circuit by making use of the harmonics of the fundamental frequency characteristics of rod 16. This is accomplished by reversing the connections to either the output coil 14 or to the input coil 13 and adjusting the frequency characteristics of the output circuit to approximately the frequency of the desired harmonic energy. The distance "d" between inductance coils 13 and 14 should be carefully readjusted to obtain the proper phase relationship of the energy in the circuits for maximum power generated.

The circuit shown in Fig. 2 of the accompanying drawings illustrates a balanced magnetostrictive oscillator using two four electrode tubes. These tubes are used as space charge control electrode devices. The control electrodes 5 and 6 of thermionic tubes 1 and 2 respectively are supplied with a source of positive potential bias from the anode supply battery 17. The electrodes 5 and 6 here referred to as control electrodes are usually called, when connected in this manner, space charge grids. Shielding anode electrodes 5a and 6a are connected to inductance 13 and in operation function as control electrodes. The magnetostrictive rod 16 is coupled to the input and output of the balanced amplifier system by means of the input coil 13 and the output coil 14. The distance "d" between the input and output coils 13 and 19, is adjustable and should be adjusted for the proper phase relationship for maximum power output. The anode supply source 17 is connected directly to cathodes 3 and 4 and to anodes 7 and 8 through centertap 19 on the output coil 14. Choke coil 18 excludes oscillation currents from source 17. The shielding anode electrode bias potential supplied electrodes 5a and 6a is from source 10 through resistors 11 and 12. The electrodes 5a and 6a here referred to as shielding anode electrodes are used in this circuit as control grid electrodes. Resistors 11 and 12 may be replaced by high frequency choke coils. The output circuit including inductance coil 14 and condenser 15 is adjusted to a frequency value approximately that of resonance with magnetostrictive rod 16 or a multiple frequency thereof.

The direction of the output current at a given instant are indicated by arrows 20. The currents are in the same direction in the output coil 19 and thus produce an additive effect. Fig. 3 is a schematic circuit diagram showing the balanced magnetostrictive oscillator circuit using shielding anode four electrode tubes. The shielding anodes are commonly referred to as screen grid electrodes. In this circuit arrangement the magnetostrictive member comprises a toroidial shaped metallic member 16, which may be replaced by a rod. The distance between coils 13 and 14 may be adjusted to obtain the proper phase relation for maximum energy output.

The circuit arrangement of my invention consists of an electrically balanced thermionic tube generating system wherein the generated energy is of substantially uniform frequency. The great precautions necessary to employ when using a mechanically vibratile element such as quartz having piezo electric properties, is avoided and unnecessary when the magnetostrictive element is employed. The metallic rod may comprise any suitable metal such as nickel, iron or alloys of chromium, iron or nickel, or any other metal or alloy possessing magnetostrictive properties. The physical dimensions of the magnetostrictive member are directly proportional to the wave length of the generated signaling energy or inversely proportional to the frequency.

I realize that many modifications of the circuit arrangement of my invention are possible without departing from the spirit of my invention as defined in the appended claims and it is to be clearly understood that the embodiments of my invention are not to be restricted to the foregoing specification or to the accompanying drawings but only as defined by the scope of the appended claims.

What I claim as new and desire to secure by Letters Patent of the United States is as follows:

1. An electrically balanced circuit arrangement comprising in combination a plurality of thermionic tubes having cathodes, anodes, shielding anode electrodes and control electrodes, input and output circuits interconnecting said electrodes, an inductance included in said input circuit, an inductance included in said output circuit, said inductances being wound in the same direction and a magnetostrictive rod extending through said inductances and means for tuning said circuits to the frequency of free vibration of said magnetostrictive rod.

2. An electrically balanced circuit arrangement comprising in combination a plurality of thermionic tubes having cathodes, anodes, shielding anode electrodes and control electrodes, input and output circuits interconnecting said electrodes, means for energizing said shielding anode electrodes, the cathode and control electrodes of said tubes being connected with an inductance coil, the anode and cathode electrodes of said tubes being connected with a second inductance coil, tuning means connected in shunt with one of said coils and a magnetostrictive member common with the electrical axes of said inductance coils, said tuning means being adjustable to a frequency corresponding to the natural frequency of said magnetostrictive member.

3. An electrically balanced circuit arrangement comprising in combination a plurality of thermionic tubes having cathodes, anodes, shielding anode electrodes and control electrodes, the cathode and control electrodes of said tubes being connected with an inductance coil, the anode and cathode electrodes of said tubes being connected with a second inductance coil, means for energizing said shielding anode electrodes, means for tuning one of said coils, a magnetostrictive member extending through the electrical axes of said inductance coils, the physical dimensions of said magnetostrictive member being such that said member has a natural frequency corresponding to the frequency of said tuning means.

4. An electrically balanced circuit arrangement comprising in combination a plurality of thermionic tubes having cathodes, anodes, shielding anode electrodes and control electrodes, an input circuit including the cathode and control electrodes of said tubes, an inductance coil connected with said input circuit, an output circuit including the anode and cathode electrodes of said tubes, a second inductance coil including in said output circuit, means connected in shunt with said second inductance coil for tuning said output circuit, said coils being adjustably positioned with respect each to the other, and a magnetostrictive member extending through the electrical axes of said inductance coils.

5. An electrically balanced circuit arrangement comprising in combination a plurality of thermionic tubes having cathodes, anodes, shielding anode electrodes and control electrodes, means for energizing said shielding anode electrodes, an input circuit including the cathode and control electrodes of said tubes, an inductance coil connected in said input circuit, an output circuit including the anode and cathode electrodes of said tubes, a second inductance coil connected in said output circuit, the spacial relation of said coils being adjustable, and a metallic magnetostrictive member common with the electrical axes of said inductance coils.

6. An electrically balanced circuit arrangement comprising in combination a plurality of thermionic tubes having cathodes, anodes, shielding anode electrodes and control electrodes, an input circuit including the cathode and control electrodes of said tubes, an inductance coil connected in said input circuit, an output circuit including the anode and cathode electrodes of said tubes a second inductance coil included in said input circuit, a magnetostrictive member common with the electrical axes of said inductance coils, the spacial relation of said coils being adjustable, and the physical dimension of said magnetostrictive member being such that said member has a natural frequency within the frequency range of the aforesaid circuits.

7. An electrically balanced circuit arrangement comprising in combination a plurality of thermionic tubes having cathodes, anodes, shielding anode electrodes and control electrodes, an inductance coil connected in circuit with said cathode and control electrodes, a second inductance coil connected in circuit with said anode and cathode electrodes, means for tuning one of said inductance coils, a metallic toroidal member extending through the electrical axes of said inductance coils, the physical dimension of said member being such that the magnetostrictive properties thereof are effective at a frequency within the frequency range of said tuning means.

8. An electrically balanced circuit arrangement comprising in combination a plurality of thermionic tubes having cathodes, anodes, shielding anode electrodes and control electrodes, an input circuit interconnecting the cathode and control electrodes of said tubes, an inductance coil disposed in said input circuit, an output circuit interconnecting the anode and cathode electrodes of said tubes a second inductance coil located in said output circuit, means for tuning said output circuit, said coils being adjustably positioned in respect each to the other, and a metallic toroidial member common with the electrical axes of said inductance coils said metallic toroidal member having magnetostrictive properties lying within the frequency range of the tuning means in said output circuit.

9. An electrically balanced circuit arrangement comprising in combination a plurality of thermionic tubes having cathodes, anodes, shielding anode electrodes and control electrodes, a control circuit interconnecting the cathode and control electrodes of tubes, an inductance coil located in said control circuit, an output circuit interconnecting the anode and cathode electrodes of said tubes, a second inductance coil located in said output circuit, a variable impedance element connected in shunt with said coil for tuning said output circuit to a predetermined frequency range, the spacial relation of said coils being adjustable, and a metallic toroidal shaped magnetostrictive member common with the electrical axes of said inductance coils the magnetostrictive properties of said member lying within the frequency range of said variable impedance element.

10. An electrically balanced circuit arrangement comprising in combination a plurality of thermionic tubes having cathodes, anodes, shielding anode electrodes and control electrodes, a control circuit including the cathode and control electrodes of said tubes, an inductance coil disposed in said control circuit, an output circuit interconnecting the anode and cathode electrodes of said tubes, a second inductance coil disposed in said output circuit, means connected with said second inductance coil for tuning said output circuit, a metallic toroidial shaped member common with the electrical axes of said inductance coils, the spacial relation of said coils being adjustable, and the physical dimension of said member being such that said member has a natural frequency equal to that of the tuned output circuit.

11. An electrically balanced circuit arrangement comprising in combination a plurality of thermionic tubes having cathodes, anodes, shielding anode electrodes and control electrodes, an input circuit interconnecting the cathode and control electrodes of said tubes, an inductance coil disposed in said input circuit, an output circuit including the anode and shielding anode electrodes of said tubes, a second inductance coil disposed in said output circuit and a magnetostrictive member common with the electrical axes of said inductance coils.

12. An electrically balanced circuit arrangement comprising in combination a plurality of thermionic tubes having cathodes, anodes, shielding anode electrodes and control electrodes, a control circuit interconnecting the cathode and control electrodes of said tubes, an inductance coil disposed in said control circuit, an output circuit including the anode and shielding anode electrodes of said tubes, a second inductance coil disposed in said output circuit, means for tuning said output circuit and a metallic rod member common with the electrical axes of said inductance coils, the physical dimensions of said member being such that the magnetostrictive properties of said member lie within a frequency range over which said tuning means is responsive.

13. An electrically balanced circuit arrangement comprising in combination a plurality of thermionic tubes having cathodes, anodes, shielding anode electrodes and control electrodes, a control circuit including the cathode and control electrodes of said tubes, an inductance coil disposed in said control circuit, an output circuit including the anode and shielding anode electrodes of said tubes, a second inductance coil disposed in said output circuit, means connected in shunt with said second inductance coil for tuning said output circuit, said coils being adjustably positioned in respect each to the other and a metallic rod member common with the electrical axes of said inductance coils.

14. An electrically balanced circuit arrangement comprising in combination a plurality of thermionic tubes having cathodes, anodes, shielding anode electrodes and control electrodes, a control circuit including the cathode and control electrodes of said tubes, an inductance coil connected in said control circuit, an output circuit including the anode and shielding anode electrodes of said tubes, a second inductance coil connected in said output circuit, means for tuning said output circuit, the spacial relation of said coils being adjustable, and a metallic member having magnetostrictive properties common with the electrical axes of said inductance coils, said member having a natural frequency lying within the frequency range of said output circuit.

15. An electrically balanced circuit arrangement comprising in combination a plurality of thermionic tubes having cathodes, anodes, shielding anode electrodes and control electrodes, a control circuit including the cathode and control electrodes of said tubes, an inductance coil disposed in said control circuit, an output circuit including the anode and shielding anode electrodes of said tubes, a second inductance coil connected in said output circuit, means for tuning said output circuit and a metallic rod member common with the electrical axes of said inductance coils, the spacial relation of said coils being adjustable, and the physical dimension of said member being such that it has a natural magnetostrictive frequency equal to that of the tuned output circuit.

In testimony whereof I affix my signature.

JAMISON R. HARRISON.